Patented Dec. 27, 1927.

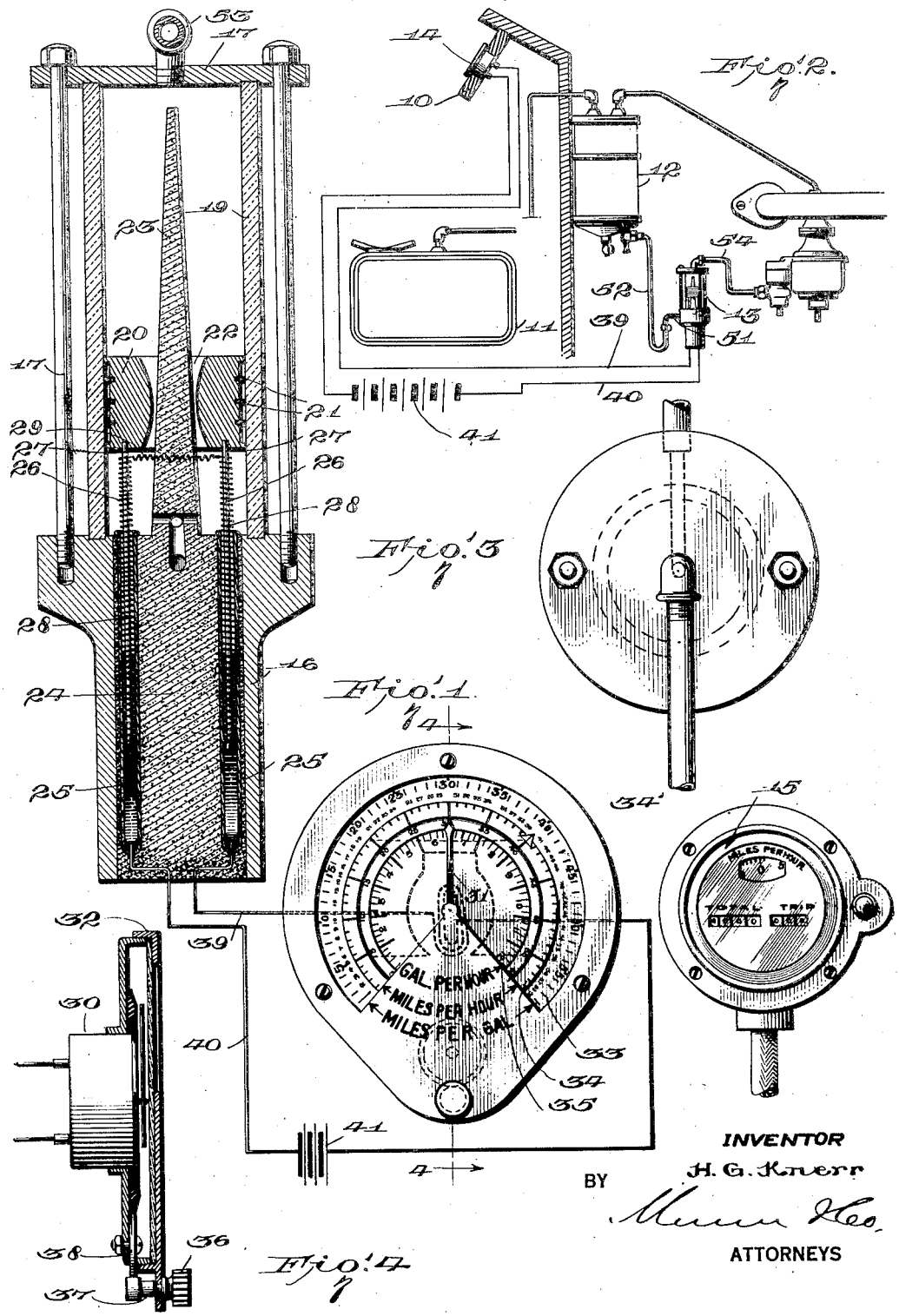

1,654,421

UNITED STATES PATENT OFFICE.

HUGH J. KNERR, OF HAMPTON, VIRGINIA.

MILEAGE METER.

Application filed September 14, 1926. Serial No. 135,425.

This invention relates to a device for calculating and indicating the consumption of fuel liquid or the like.

The object of the invention is to provide a device of the above character which can be operated in conjunction with the fuel supply system of a motor vehicle or the like for calculating and indicating the rate of fuel consumption by the engine of the motor vehicle with respect to the rate of travel of the vehicle.

It is also an object of the invention that the device be capable for calculating and indicating the amount of fuel consumed by the engine or a motor vehicle or the like during a stated period.

It is also within the scope of the objects of the invention that the device be accurate in operation and inexpensive to manufacture.

Other objects and objects relating to details of construction and arrangement of parts will hereinafter appear in the detail description to follow.

The invention is illustrated by way of example in the accompanying drawings, in which—

Figure 1 is a schematic view showing in vertical section the fuel metering device of this invention together with the indicating devices associated therewith for carrying out my invention;

Fig. 2 is a view similar to Figure 1 showing my invention applied to a motor vehicle;

Fig. 3 is a top plan view of the liquid metering device; and

Fig. 4 is a vertical sectional view taken substantially on the line 4—4 in Fig. 1.

Referring to the drawings, more particularly in Fig. 2, 10 indicates generally the instrument board of a motor vehicle, 11 a fuel tank, and 12 a vacuum tank such as commonly employed in a liquid fuel system for internal combustion engines. At 13 I have shown the metering device of this invention and at 14 the calculating and indicating device connected with said metering device. I have also shown a speedometer in Fig. 1 which is usually carried by a motor vehicle or other motor propelled device. The speedometer is indicated generally by the reference character 15 and is arranged as would appear on an instrument board carrying the calculating and indicating device 14.

The liquid metering device comprises a base 16 which may be of brass and in the form of a nipple. Upon the outer end of the plug are mounted the rods 17 which extend through the plate 18. Suitable grooves in said plate and in the outer end of plug 16, support a glass tube 19. Within the tube 19 there is freely slidable a piston head 20 carrying suitable sealing or piston rings 21. The piston head 20 has a passage 22 therethrough which is restricted towards its longitudinal center from both ends thereof as shown in Fig. 1.

Within the tube 19 is a metering pin 23 which tapers towards its upper and free end. The pin 23 is freely slidable through the passage in piston head 20, and is supported by a suitable compound 24 which fills the interior of the nipple 16. Also within the nipple or base 16 I arrange two tubes 25 which are preferably of glass and retained in fixed position by the compound 24. Each tube has therein a certain quantity of mercury and slidable in each tube is a plunger 26. Each plunger 26 may comprise a suitable rod 27 secured at one end to the piston head 20 and having wrapped tightly thereabout a fine resistance wire 28 which wires are connected at their upper ends as shown at 29. The plungers 26 in conjunction with the mercury in the tubes 25 provide for a dash-pot action in movements thereof in said tubes.

The device 14 may be in the form of a conventional voltmeter or the like and comprises a suitable casing 30 in which the usual means for operating pointer 31 may be located. The casing 30 may carry the usual frame 32 within which there are mounted three scales 33, 34, and 35. The scales 33 and 35 are stationary, while the scale 34 may be rotated. The scale 34 has fixed thereon an under point 34'. The scale 34 may be rotated by a knob 36 which extends from a pin 37 slidable in an arcuate slot provided in the frame 32. The inner end of pin 37 is secured to one end of a disk 38 depending from the scale element 34, as shown in Fig. 4. The voltmeter housed in casing 30 is connected to the resistance wires 28 by the lead wires 39 and 40, and in wire 40 there is interposed a source of current such as a battery indicated at 41.

The base member 16 of the metering device carries a nipple 51 which is connected through a suitable pipe 52 with the vacuum tank 12, said vacuum tank being connected in the usual manner with the supply tank 11. The top plate or cover 18 for tube 19 carries a nipple 53 which is connected to the carburetor of the associated engine through a suitable pipe 54 as shown in Fig. 2.

The operation of the device is as follows: The liquid fuel used by the engine with which the apparatus is associated flows through pipe 52 into lower end of glass tube 19 and from thence through the nipple 53 and pipe 54 to the associated carburetor and engine. The liquid fuel must pass through the restricted passage 22 of piston head in tube 19 and this passage is partly closed by metering stem 23. As the flow of liquid fuel increases the member 20 rises in glass tube 19 and due to tapering of stem 23 the volume of liquid flowing increases with upward movement of head 20. The tubes 25 have sufficient mercury in the same so that when the piston head 20 is in its lowermost position in the tube 19, the mercury reaches substantially the tops of the tubes. At this time the effective resistance of wires 28 is at a minimum and the pointer 31 should give a zero reading. As the fuel is drawn through the tube 19 and the head 20 rises the effective resistance of wires 28 increase and the needle 31 would be deflected correspondingly.

As I have indicated upon the voltmeter the scale 33 may read in "miles per gallon," the scale 34 in "miles per hour" and scale 35 read in "gallons per hour."

When it is desired to find or calculate how many miles are being obtained for a gallon of liquid fuel, the speed of travel is first ascertained from the speedometer 15, then the dial or scale 34 is rotated to bring the number thereon indicating the number of miles the vehicle is moving per hour to register with needle or pointer 31, and the miles obtained per gallon of fuel can be ascertained by reading the number on scale 33 which the index point 34' indicates.

When it is desired to ascertain the amount of fuel being used per hour the same can be found by ascertaining the number on dial or scale 35 occurring beneath needle or pointer 31.

While I have shown my device as applied to a motor vehicle, it is to be understood that I am cognizant of the fact that the same may have other uses where it is necessary to measure the consumption or flow of a liquid during stated periods of time. Also I wish it to be understood that while I have shown and described the preferred embodiment of my invention, I am well aware of the fact that the general arrangement and combination of parts utilized might be changed by those skilled in the art without departing from the spirit of my invention.

I claim:

1. In a liquid metering device, a rheostat comprising a base, a transparent tube mounted on said base, a piston head slidable in said tube and having sealing rings engaging the walls thereof, said head having a passage extending therethrough and restricted toward its longitudinal center from both ends, a resistance element carried by said piston head, and means whereby the resistance of said element will be varied to correspond to the movement of the head.

2. A rheostat comprising a base, a transparent tube mounted on said base, a piston head slidable in said tube and having sealing rings engaging the walls thereof, said head having a passage extending therethrough and restricted toward the longitudinal center from both ends, a resistance element carried by said piston head, and means whereby the resistance of said element will be varied to correspond to the movement of the head, and a tapered pin carried by said base and extending through said head whereby the size of the opening in the head is varied when the relative positions of the head and pin are altered.

HUGH J. KNERR.